United States Patent [19]

Nakasugi et al.

[11] E Re. 31,251

[45] Reissued May 24, 1983

[54] PROCESS FOR PRODUCING A HIGH TENSION STEEL SHEET PRODUCT HAVING AN EXCELLENT LOW-TEMPERATURE TOUGHNESS WITH A YIELD POINT OF 40 KG/MM² OR HIGHER

[75] Inventors: Hajime Nakasugi; Hiroaki Masui; Hiroshi Tamehiro; Tetuo Takeda; Seiji Eiro, all of Kimitsu, Japan

[73] Assignee: Nippon Steel Corporation, Tokyo, Japan

[21] Appl. No.: 207,068

[22] Filed: Nov. 14, 1980

Related U.S. Patent Documents

Reissue of:

[64] Patent No.: 4,105,474
Issued: Aug. 8, 1978
Appl. No.: 786,946
Filed: Apr. 12, 1977

U.S. Applications:

[63] Continuation of Ser. No. 29,868, Apr. 13, 1979, abandoned.

[30] Foreign Application Priority Data

Apr. 12, 1976 [JP] Japan ..... 51-40258

[51] Int. Cl.³ ..... C21D 8/02

[52] U.S. Cl. ..... 148/12 F; 148/36

[58] Field of Search ..... 148/12 R, 12 C, 12 D, 148/12 F, 12.3, 36; 75/123 M

[56] References Cited

U.S. PATENT DOCUMENTS

| | | | |
|---|---|---|---|
| 3,795,506 | 3/1974 | Yamaguchi et al. | 75/123 M |
| 3,857,740 | 12/1974 | Gondo et al. | 148/12 F |
| 3,904,447 | 9/1975 | Gondo et al. | 148/12.3 |
| 3,960,612 | 6/1976 | Kaku et al. | 148/12 F |
| 3,976,514 | 8/1976 | Matsukura et al. | 148/12 F |
| 4,008,103 | 2/1977 | Miyoshi et al. | 148/12 F |
| 4,138,278 | 2/1979 | Nakasugi | 148/12 F |

*Primary Examiner*—Peter K. Skiff
*Attorney, Agent, or Firm*—Wenderoth, Lind & Ponack

[57] ABSTRACT

The production process characterized in that a steel ingot or slab containing not less than 0.004% of TiN not larger than 0.02μ is heated to a temperature not higher than 1150° C. and rolled, and growth of the γ grains during this heating and rolling step is prevented by TiN to improve the toughness, and the resultant steel product has an excellent low-temperature toughness with a yield point of 40 kg/mm² or higher, and is useful as hot rolled or as heated at a temperature ranging from 300° to 750° C. after the hot rolling.

3 Claims, 8 Drawing Figures

PROCESS FOR PRODUCING A HIGH TENSION STEEL SHEET PRODUCT HAVING AN EXCELLENT LOW-TEMPERATURE TOUGHNESS WITH A YIELD POINT OF 40 KG/MM² OR HIGHER

Matter enclosed in heavy brackets [ ] appears in the original patent but forms no part of this reissue specification; matter printed in italics indicates the additions made by reissue.

*This is a continuation of Ser. No. 29,868, filed Apr. 13, 1979, abandoned, reissue application of U.S. Pat. No. 4,105,474, which matured from Ser. No. 786,946, filed Apr. 12, 1977.*

BACKGROUND OF THE INVENTION

1. Field of the Invention:

The present invention relates to a process for producing high tension steel products, such as plates, sheets and strips (herein called sheets), having an excellent low-temperature toughness with a yield point of 40 kg/mm² or higher.

The steel products according to the present invention are useful as hot rolled or as heated at a temperature ranging from 300° to 750° C. after the hot rolling.

2. Description of Prior Art:

Conventionally, steel sheets such as for pipe lines in cold climate regions whih are required to have high strength and toughness in the "as rolled" condition have been produced by a method called "controlled rolling" (hereinafter abridged as CR), and mainly Nb-containing steels have been used for this purpose.

Generally, the CR method is composed of two steps; the first step is a heating step and the second step is a rolling step (cooling), if largely classified. The following considerations must be made in these steps, respectively.

(1) In the heating step, it is required to dissolve elements such as Nb and V enough for refinement of the structure and precipitation hardening, and it is required to maintain the austenite grains during the heating (heated $\gamma$ grains) as fine as possible.

(2) In the rolling step, it is necessary to recrystallize the heated $\gamma$ grains repeatedly by rolling to obtain refined rolled austenite grains (rolled $\gamma$ grains), and it is necessary to elongate the rolled $\gamma$ grains and reduce their thickness by rolling in their non-recrystallization zone so as to obtain refinement of the rolled structure.

However, in case of Nb-containing steels as commonly used, Nb(CN) is stable at high temperatures and it is difficult to ressolve Nb(CN) consistently and satisfactorily even by a long heating time if the heating temperature is not higher than 1150° C.

If the heating temperature is raised, it is possible to attain a satisfactory solid solution of Nb(CN). On the other hand, the heated $\gamma$ grains grow excessively, thus resulting in considerable deterioration of the toughness of the rolled steel.

Therefore, in the CR method, it is necessary to lower the heating temperature to keep the heated $\gamma$ grains smaller when severe low-temperature toughness is required. On the other hand, when the heating temperature is lowered, the amount of Nb in solid solution increases or decreases depending on a slight change in the heating temperature and time in case of the commonly used Nb-containing steels. Even under the same rolling conditions, the resultant strength fluctuates in a wide range depending on the change in the amount of the solid solution Nb, and high strength, if obtained, is accompanied with deterioration of toughness. Thus, it is difficult to obtain a stable balance between strength and toughness.

The above difficulties can be attributed to the fact that toughness lowers in proportion to the increase of strength, and the increase of strength corresponds to the increase of the amount of Nb(CN) in solid solution and the coarsening of the heated $\gamma$ grains, so that the steel structure will be made of coarse and mixed grains.

However, in the conventional CR method, proper consideration has not been given to the fact that the heated $\gamma$ grains coarsen when enough Nb(CN) is dissolved in solid solution during the heating step, and thus toughness is deteriorated.

As described above, it is necessary to prevent the growth of the heated $\gamma$ grains by means of the precipitation in order to maintain fine heated $\gamma$ grains and improve toughness.

For this purpose, it is required to lower the heating temperature and keep the precipitates such as Nb(CN) from solid solution during the heating. On the other hand, in order to maintain the strength, it is necessary to dissolve Nb(CN) into solid solution as much as possibleduring the heating so as to precipitate it during the cooling after the rolling to strengthen the steel. For this purpose, it is desirable to maintain the heating temperature as high as possible.

SUMMARY OF THE INVENTION

Therefore, one of the objects of the present invention is to solve the completely contradictory problems as mentioned above, and provide a steel sheet having remarkably smaller heated $\gamma$ grains than those of conventional steels in spite of Nb(CN) in solid solution for strength, and showing a stable and excellent balance between strength and toughness if appropriate rolling conditions are applied thereto.

The features of the present invention may be summarized as follows:

(1) In order to attain satisfactory and stable Nb(CN) in solid solution, the carbon content is lowered to an extreme degree as understood from the solubility product relation.

(2) The growth of the heated $\gamma$ grains due to full solid solution of Nb(CN) is prevented by TiN which is stronger than Nb(CN) for prevention of the growth of the heated $\gamma$ grains, and (3) Optimum rolling conditions are selected.

By the above features in combination, it is possible to utilize Nb(CN) and TiN separately for different purposes; the former for strengthening the steel and the latter for preventing the growth of the heated $\gamma$ grains, and thus the problem in the heating step can be solved.

Starting from the fine heated $\gamma$ grains, a rolled structure having still finer grains can be obtained by rolling under proper conditions. Remarkable strength and toughness can be obtained through the decrease in the pearlite proportion attained by the lowered carbon content as well through the grain refinement.

Regarding improvement of the steel toughness by refinement of the heated $\gamma$ grains, the present inventors disclosed a method therefor in Japanese Patent Application Sho 49-103088, and the present inventors have conducted further various extensive studies on production of a high tension steel having excellent toughness at low temperatures, and have found that the toughness can be stabilized and improved remarkably according to the production process of the present invention.

The production process according to the present invention is characterized in that a steel ingot or slab containing not less than 0.004% of TiN not larger than 0.02μ is heated to a temperature of or below 1150° C. and rolled, and growth of the γ grains during this heating and rolling step is prevented by TiN to improve the toughness.

DETAILED DESCRIPTION OF THE INVENTION

The present invention will be described in detail referring to the attached drawings.

Regarding the definition of TiN not larger than 0.02μ, it also includes Ti and N which are present in solid solution in the steel and TiN which is present in the form of a precipitate and has a size not larger than 0.02μ. Ti and N are present in solid solution in the steel precipitate as TiN not larger than 0.02μ during the subsequent heating and effectively prevent the coarsening of the heated γ grains. In this case, according to the studies made by the present inventors, there is a correlation between the heated γ grain size and the heating rate. When the heating rate starting from 800° C. to a predetermined temperature is excessively high, Ti and N do not precipitate fully, thus failing to obtain a satisfactory refinement of the heated γ grains. Therefore, in order to refine the heated γ grains, it is necessary to decrease the heating rate to some degree, and it is preferable to control the heating rate starting from 800° C. to a predetermined temperature to a rate not larger than 6° C./min.

Figure 1:
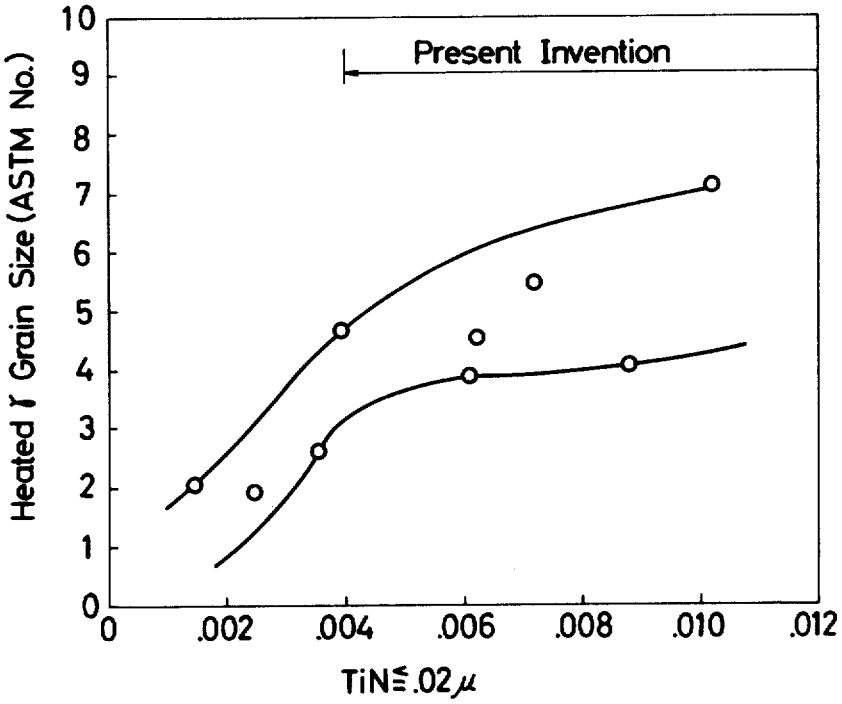
FIG. 1 shows the relation between the heated γ grain size and the content of TiN (%) not larger than 0.02μ, when heated to 1150° C. and held at that temperature for 60 minutes.

In FIG. 1 which shows the amount of TiN not larger than 0.02μ and the heated γ grain size, when the steel is heated to 1150° C. and held at that temperature for 60 minutes, it is clear that unless TiN not larger than 0.02μ is present in an amount of 0.004% or more, no satisfactory refinement of the heated γ grains can be expected. Therefore, it is necessary that TiN not larger than 0.02μ is present in an amount not less than 0.004% in the steel before the heating. However, even when this condition is satisfied, the prevention effect on the coarsening of the heated γ grains by TiN becomes unstable if the heating temperature is excessively high.

Figure 2:
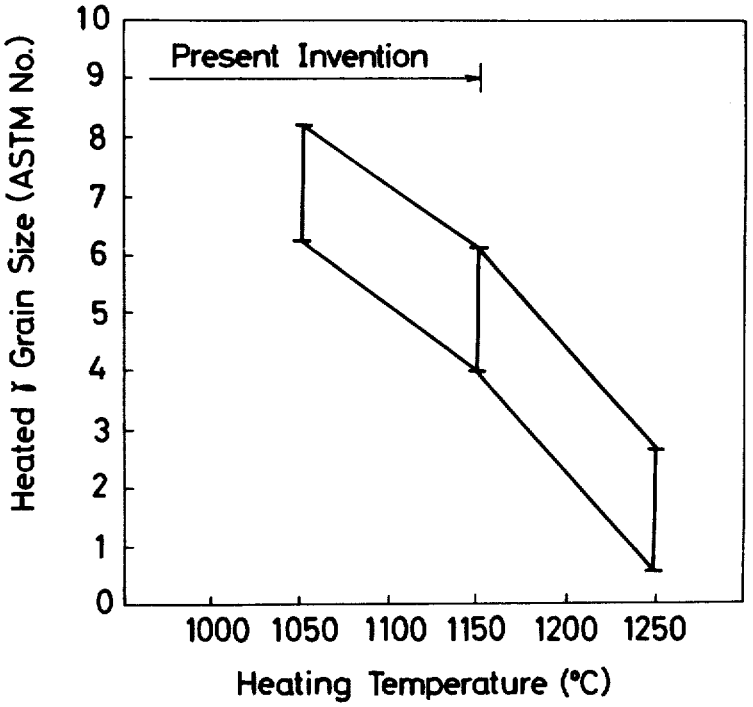
FIG. 2 shows the relation between the heating temperatures and the heated γ grain size when the steel No. 2 in Table 1 according to the present invention is heated to various temperatures and held at such temperatures for 60 minutes.

As is understood from FIG. 2 showing the relation between the heating temperature and the heated γ grain size, it is necessary to maintain the heating temperature at 1150° C. or lower, preferably in a range from 900° to 1150° C. in order to obtain fine heated γ grains (not lower than No. 3 of ASTM).

As described above, satisfactory refinement of the heated γ grains can be obtained under appropriate condition when TiN not larger than 0.02μ is present in an amount not less than 0.004%.

Hereinbelow, descriptions will be made on the method of introducing into the steel not less than 0.004% of TiN not larger than 0.02μ in connection with the ingot-making method and the continuous casting method, respectively.

In the ingot-making method, the coarse TiN which has precipitated during the solidification step of the molten metal are dissolved in solid solution in an amount not less than 0.004% during the ingot heating (soaking) step, and part of the solid solution TiN is precipitated during the break down rolling step and the cooling step to maintain not less than 0.004% of TiN, not larger than 0.02μ in the steel slab before the heating. In this case, if the Ti content is excessive, it is difficult to maintain not less than 0.004% of TiN in solid solution during the ordinary ingot heating step, because TiN precipitates in an excessively coarse form during the solidification step. Even in this case, the solid dissolution of TiN depends on the heating temperature and the holding time, but if the heating temperature is too high, there is caused the burning phenomenon and thus there is a certain maximum heating temperature inherent to the steel. Therefore, on the basis of the present steel making techniques, it is necessary that the content of Ti is maintained not larger than 0.03% and the amount of Ti required for the minimum amount of 0.004% for TiN not larger than 0.02μ is 0.004% in commercial production taking into consideration the amount of Ti consumed for formation of oxides etc. Therefore, the content of Ti should be in a range from 0.004 to 0.03%.

Next, detailed explanations will be made hereinbelow on the limitations of the heating temperature for a solid dissolution of TiN which has precipitated during the solidification of the molten steel as well as the limitations of the N and TiN contents.

For economical and stable solid dissolution of TiN during the heating step on a commercial level, it is effective to limit not only the Ti content, but also the N content. The reason for setting the lower limit of the total N content at 0.001%, is that it is the minimum amount required for the lower limit of 0.004% of TiN which must be dissolved in solid solution during the heating step. Further, in order to maintain enough of the TiN which is dissolved in solid solution during the heating step, it is not favourable that the upper limit of the total N content exceeds the upper limit of the Ti content. Therefore the upper limit of the total N content is set at 0.009% which corresponds to 0.03% of Ti. On the other hand, if the TiN content exceeds 0.04%, the toughness of the steel sheet is deteriorated. Thus, it is necessary to set the upper limit of the TiN content at 0.04%, but so far as the Ti and total N contents are within the ranges defined above, the TiN content does not exceeds 0.04%.

Figure 3:
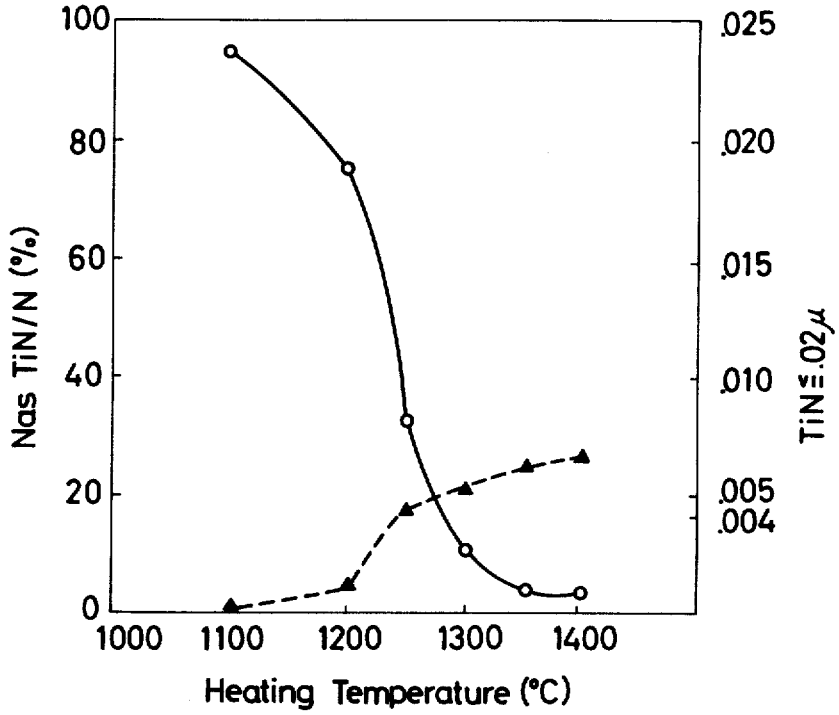
FIG. 3 shows the relation between the ratio of NaS TiN/N (marked by O) and the heating temperature when the steel No. 1 in Table 1 according to the present invention is heated to various temperatures and held at the various temperatures for 120 minutes and rapidly cooled in water, and the relation between the content (%) of TiN (marked by Δ) not larger than 0.02μ when the same steel is heated to 1150° C. and held at that temperature for 120 minutes.

When the Ti and N contents are within the ranges defined in the present invention, the lower limit of the heating temperature for dissolving not less than 0.004% of TiN into solid solution may be 1250° C. as shown in FIG. 3 and confirmed by experiments, while the upper limit is set at 1400° C. as a practically feasible temperature in spite of a partial burning of the iron oxide on the steel surface.

Figure 4:
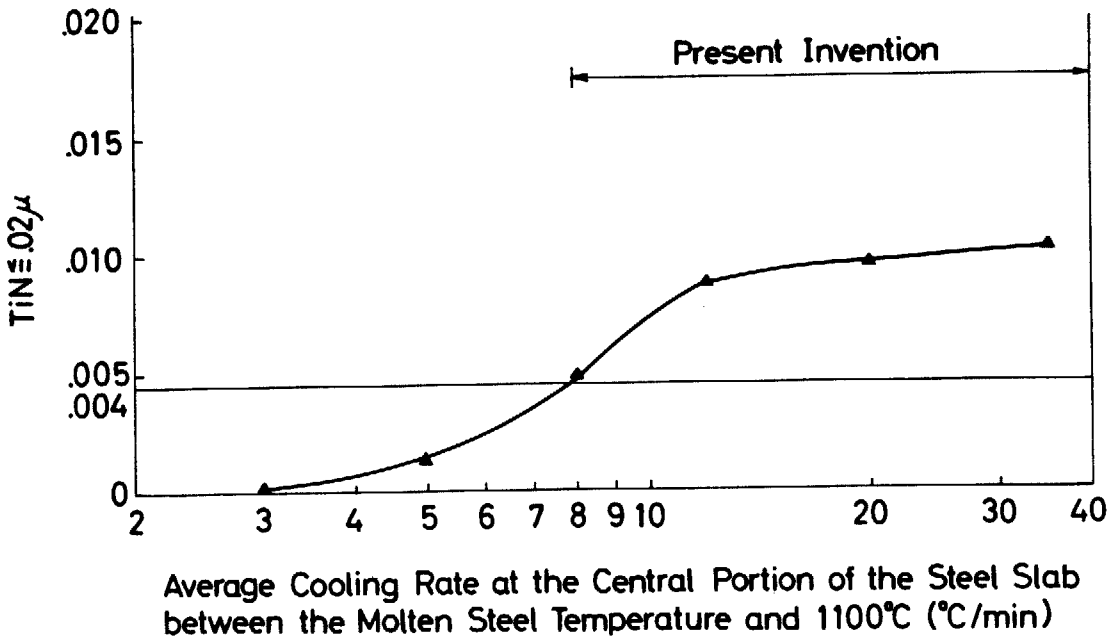
FIG. 4 shows the relation between the average cooling rate and the content (%) of TiN not larger than 0.02μ when the steel No. 1 in Table 1 according to the present invention is cast at various solidification rates.

In the continuous casting method, where the steel slabs are made directly from the molten steel, if the Ti and N contents are excessive, coarse TiN precipitates during the solidification so that it is impossible to maintain not less than 0.004% of TiN not larger than 0.02μ. Therefore, just as in the ingot-making method, it is necessary to limit the Ti and N contents respectively to 0.004 to 0.03% Ti and 0.001 to 0.009% N. Even when the Ti and N contents are within these ranges, it is impossible to obtain not less than 0.004% of TiN not larger than 0.02μ, if the solidification cooling rate is too slow. Therefore, it is desirable that the cooling rate at the center portion of the steel slab is not less than 8° C./min. in average from the molten steel temperature at the time of casting to 1100° C. When the cooling rate is below 8° C./min., it is difficult to attain not less than 0.004% of TiN not larger than 0.02μ in the steel slab as shown in FIG. 4 and no effective prevention of the coarsening of the heated γ grains can be assured.

The basic features of the present invention have been described hereinabove.

It has been further found by the present inventors that the hot rolled steel material obtained by the above production process is reheated to a temperature ranging from 300° to 750° C., part of the fine carbides or the solid solution carbon coagulates into carbides of favourable size so that the toughness is improved due to the relief of stress by the precipitation hardening of the matrix, and the arrest property as represented by B.DWTT (Battelle Drop Weight Tear Test), as well as the yield strength are still remarkably improved.

Explanations will be made on the limitation on the steel compositions defined in the present invention.

The base steel composition applicable to the present invention comprises 0.01 to 0.13% C, 0.1 to 1.0% Si, 0.7 to 2.0% Mn, not more than 0.10% total Al, 0.004 to 0.03% Ti, 0.001 to 0.009% total N, 0.01 to 0.10% Nb, one or more of 0.01 to 0.15% V an 0.05 to 0.4% Mo and satisfying the condition of $$(NB\%)\times(C\%)\leqq 5\times 10^{-3}$$

Now the lower limit of 0.01% for the carbon content is set because it is a minimum amount for assuring the grain refinement of the steel material and strength of the weld joints as well as full development of effects of carbide forming elements such as Nb and V. On the other hand, when the carbon content is excessive, the amount of Nb in solid solution readily increases or decreases depending on even slight changes in the heating conditions as mentioned hereinbefore, and thus the strength-toughness balance becomes unstable. Therefore, it is effective to define an upper limit for the carbon content for assuring a stable solid solution of Nb(CN) in the steel slab to maintain desired strength and toughness even in cases where the heating temperature is below 1150° C.

Figure 5:
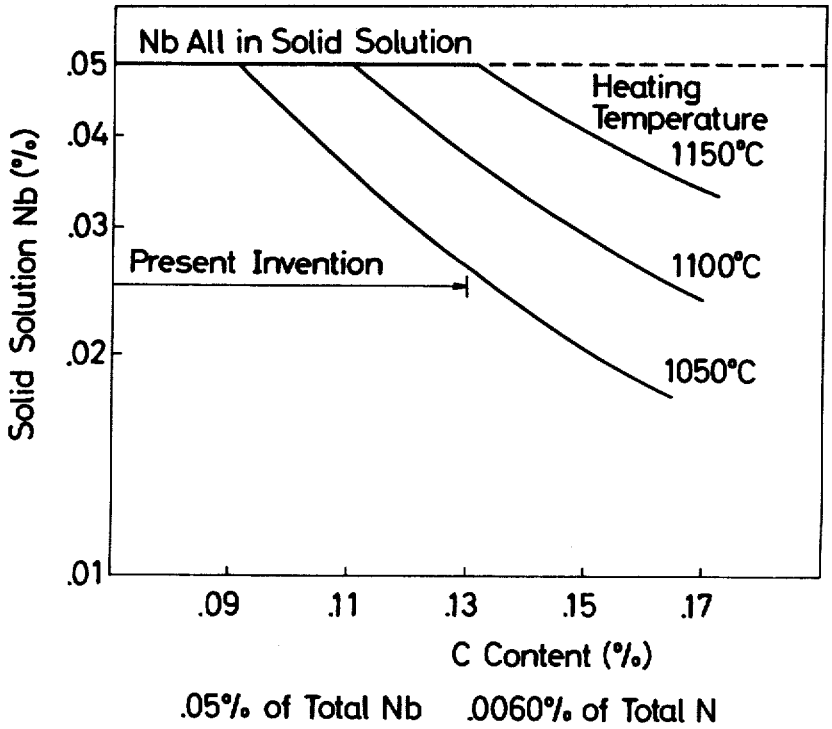
FIG. 5 shows the relation between the amount of solid solution Nb and the carbon content when steels with different carbon contents are heated to various temperatures and held at those temperatures for 30 minutes.

In FIG. 5 showing the relation between the amount of the solid solution Nb and the heating temperature in connection with various carbon contents, it is clearly shown that when the carbon content is lowered, the amount of the solid solution Nb (at a constant total Nb content of 0.05%) increases, and when the carbon content is not higher than 0.13%, Nb is completely dissolved in solid solution at 1150° C.

The reason for defining the total Nb content of 0.05% is that this amount is enough for obtaining desired strength and toughness in case of 0.13% C. Thus the upper limit of the carbon content is set at 0.13%. In cases where the Nb content is large or the heating temperature is below 1150° C., it is necessary to further lower the carbon content in order to assure a stable and high enough Nb(CN) content in solid solution. But for this purpose it is favourable to limit not only the carbon content by itself, but also the carbon content in relation with the Nb content.

Figure 6:
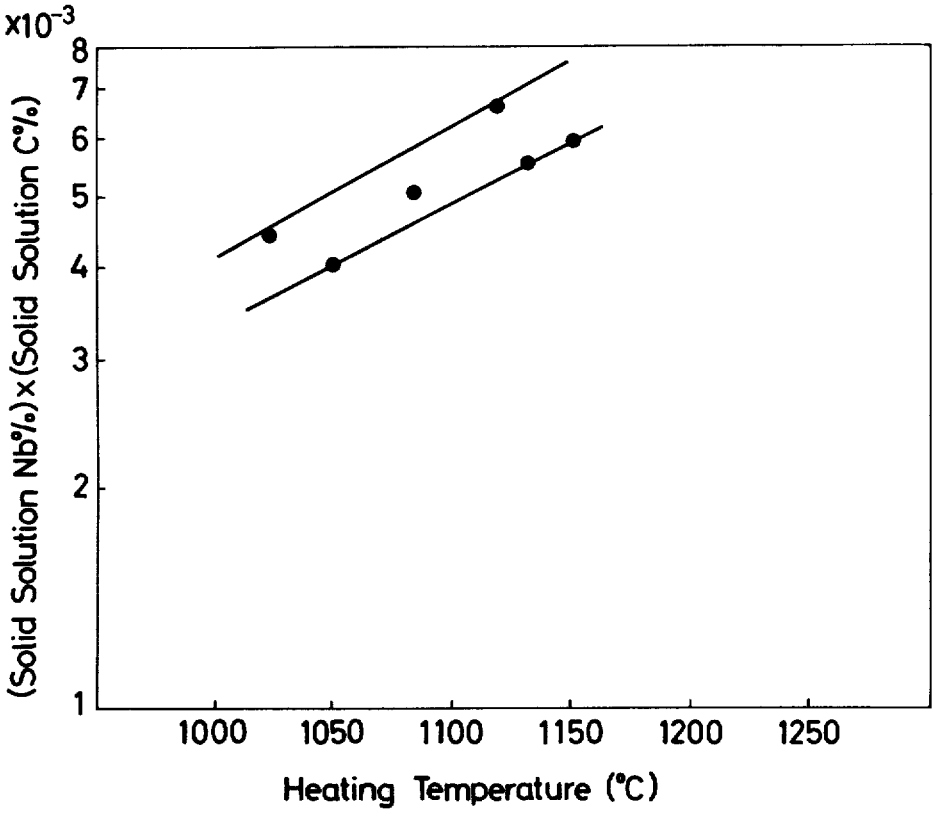
FIG. 6 shows the relation between the heating temperature and the product of (solid solution Nb%)×(solid solution C%) when the steel according to the present invention is heated to various temperatures and held at those temperatures for 60 minutes.

FIG. 6 shows the experimental results concerning the relation between the heating temperature and (solid solution Nb%)×(solid solution C%), and it is shown that Nb(CN) can be stably dissolved in solid solution when (C%)×(Nb%)≦(solid solution Nb%)×(solid solution C%).

Within the preferable heating temperature range from 1050° to 1150° C. according to the present invention, it is preferable to define as below despite some fluctuation in the data.

$$(C\%)\times(Nb\%)\leqq 5.0\times 10^{-3}$$

For the reasons set forth above, the upper limit of the carbon content is set at 0.13% and the carbon content is further limited in relation with the Nb content as $$(C\%)\times(Nb\%)\leqq 5\times 10^{-3}$$

Silicon is an element which comes into the steel unavoidably during the deoxidation step, but less than 0.1% silicon causes deterioration of the toughness. Therefore, the lower limit of the silicon content is set at 0.1%. On the other hand, when the silicon content is excessive it damages the cleanness of the steel. Thus, the upper limit of the silicon content is set at 1.0%.

Manganese is an important element for assuring the desired strength and toughness of the low-carbon steel applicable to the present invention, and with manganese contents less than 0.7% the strength and toughness are low. Thus the lower limit of the manganese content is set at 0.7%. On the other hand, when the manganese content is excessive, the toughness of HAZ (heat affected zone) deteriorates. Thus the upper limit is set at 2.0%.

Aluminum is contained in a killed steel unavoidably from the deoxidation step. However, when the total Al content exceeds 0.1%, not only the toughness of HAZ but also the toughness of the weld metal are remarkably deteriorated. Thus, the upper limit of the total Al content is set at 0.1%.

Regarding the Ti and total N contents, they are limited to 0.004 to 0.03% Ti and 0.001 to 0.009% total N respectively as mentioned hereinbefore. So far as Ti and N are within these ranges the TiN content does not exceed 0.04%.

Niobium is added for improving the toughness of the steel material and expanding the feasible range of the plate thickness as well as for assuring the joint strength of the welded portion. The lower limit of the Nb content is set at 0.01% for the reason that with Nb contents less than 0.01%, the desired refinement of the structure and the precipitation strengthening by Nb cannot be attained. Thus, it is difficult to obtain the desired strength and toughness. However, Nb addition beyond 0.10% causes difficulty in attaining enough stable solid solution Nb with a heating temperature not higher than 1150° C., and causes HAZ toughness deterioration.

Vanadium, similar to niobium, may be contained up to 0.15%.

Molybdenum, similar to niobium and vanadium, increases hardening of HAZ and lowers HAZ toughness and cracking resistance, if present in an excessive amount. Therefore, the upper limit of the molybdenum is set at 0.40%. The lower limits of V and Mo are set at 0.01% and 0.05% respectively, because these are minimum amounts for development of the full effectiveness of these elements.

The steel applicable to the present invention contains phosphorus and sulfur as impurities. Regarding the phosphorus content, it is usually not more than 0.03% and phosphorus is not intentionally added, and a lower phosphorus assures improvement of toughness. Regarding the sulfur content, it is usually not more than 0.02%, and it is possible to lower the sulfur content to about 0.0005% by the present level of the technics, and thereby the toughness of the steel sheet is improved. In the present invention, sulfur is not added intentionally.

According to one modification of the present invention, one or more of 0.001 to 0.03% REM (mainly Ce, La, Pr) and 0.0005 to 0.03%, preferably 0.0005 to 0.003% Ca is added under the condition of $$REM/S = 1.0 \text{ to } 6.0$$

With this modification, the toughness of the steel product obtained by the present invention is still further improved as shown in Table 2.

REM contents less than 0.001% produce no practical improvement of toughness, while REM contents exceeding 0.03% cause increase not only in size but also in amount of REM-oxysulfides, so that large inclusions are formed, which remarkably damage the toughness as well as the cleanness of the steel product.

Therefore, the REM content is limited to the range from 0.001 to 0.03%. Meanwhile REM is effective to improve and stabilize the toughness of the steel sheet in correlation with the sulfur content, and the optimum range for this purpose is 1.0 to 6.0 of REM/S. Calcium has similar effects as REM and is limited to the range from 0.0005 to 0.03%, preferably 0.0005 to 0.003%.

According to another modification of the present invention, one or more of not more than 0.6% Cr, not more than 1.0% Cu and not more than 4.0% Ni is added under the condition of $(Cu+Ni)/5+Cr+Mo \leqq 0.90\%$.

The main object of addition of these elements is to improve the strength and toughness of the steel product and to expand the feasible plate thickness range. Naturally, the amounts of addition of these elements are limited, but in the low-carbon steel applicable to the present invention, their upper limits may be higher than those in an ordinary carbon steel.

Regarding chromium, an excessive chromium content increases the hardenability of HAZ and lowers the toughness and cracking resistance. Therefore, the upper limit of the chromium content is 0.6%.

Nickel is effective to improve the strength and toughness of the steel product without adverse effect on the hardenability and toughness of HAZ, but nickel contents exceeding 4.0% are not favourable on the hardenability and toughness of HAZ even in case of a low-carbon steel as used in the present invention. Therefore, the upper limit of the nickel content is set at 4.0%.

Copper has almost similar effects as nickel and further improves the hydrogen-induced cracking resistance, but copper contents beyond 1.0% cause the copper-cracking during the rolling. Therefore, the upper limit of the copper content is set at 1.0%.

Further, the above addition elements are not added independently within their respective ranges, but they are are added under the condition of $$(Cu+Ni)/5+Cr+Mo \leqq 0.90\%$$

Otherwise the hardness of HAZ is remarkably higher so that HAZ is susceptible to cracking during a small heat-input welding, and thus the steel cannot be used for welding.

In a still further modification of the present invention where the steel product after hot rolling is reheated in a temperature range from 300° to 750° C., the basic steel composition should be limited.

First of all, when the carbon content is more than 0.10%, the amount of Nb, V or Mo which is dissolved in solid solution during the slab heating decreases so that the amount of the fine carbide precipitates of Nb, V or Mo during the reheating which is favourable for the strength, particularly the tensile strength, decreases.

Further, in the reheating step after the hot rolling, the fine carbides are coagulated into a suitable size so as to improve the toughness. For this purpose, carbon contents less than 0.08% are remarkably effective without formation of excessively large coagulated carbides.

Regarding the aluminum content, deoxidation of the molten steel by aluminum is particularly ncessary for assuring enough precipitates of fine carbides of Nb, V or Mo during the reheating, which are required for the desired strength. Therefore, aluminum is present in an amount of 0.005% at least.

The sulfur content should be limited to 0.010% or lower so as to fully develop the toughness improvement by the reheating.

Descriptions have been made on the limitations of the various elements of the steel composition used in the present invention. It has been further found that it is difficult to produce a steel sheet having an excellent low-temperature toughness and high strength of not lower than 40 kg/mm$^2$ yield point by rolling the steel of the defined composition within the defined range merely in an ordinary way. Therefore, in the present invention, the final rolling conditions are limited.

As the basic feature of the present invention, the rolling condition has been defined as below.

The total reduction amount in the temperature range not higher than 930° C. is not less than 50% and the finishing temperature is not higher than 830° C. Under this rolling condition, the strength and toughness of the steel product are improved remarkably.

Explanations will be made on the limitations of the rolling condition.

Figure 7:
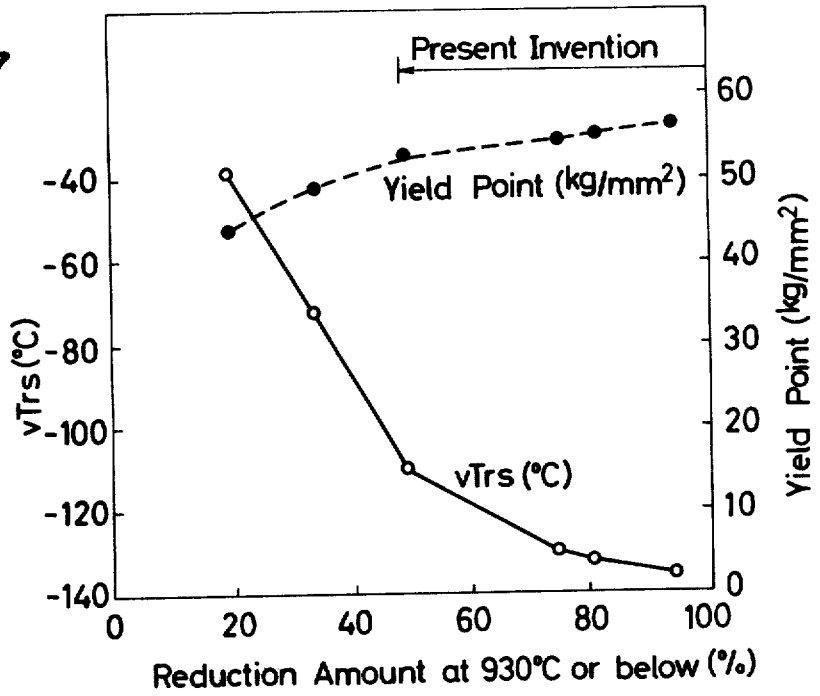
FIG. 7 shows the relation between the reduction amount at temperatures not higher than 930° C. and the yield strength YS as well as vTrs in the steel No. 2 in Table 1 according to the present invention.
Figure 8:
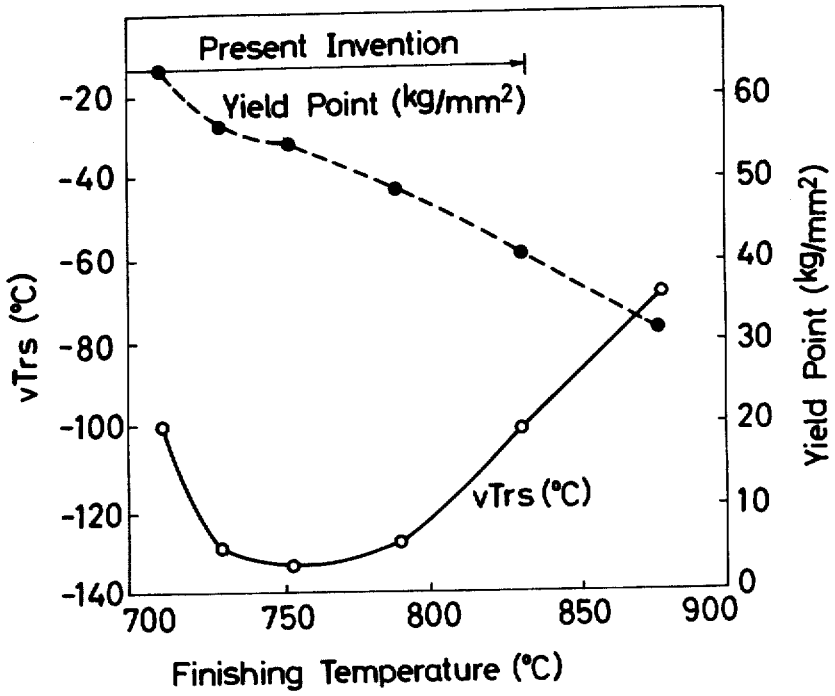
FIG. 8 shows the relation between the finishing temperature and YS as well as vTrs in the steel No. 2 in Table 1 according to the present invention.

When the total reduction amount at 930° C. or lower is not less than 50%, the yield point and toughness are remarkably improved as shown in FIG. 7, but if the total reduction amount in the temperature range is less than 50%, it is impossible to obtain a yield point not lower than 40 kg/mm$^2$ and an excellent toughness. However, even when the total reduction amount in the temperature range is not less than 50%, the desired strength and toughness cannot be obtained if the finishing temperature is higher than 830° C. as shown in FIG. 8.

Regarding the finishing temperature or the rolling temperature in several reductions prior to the finishing, satisfactory low-temperature toughness is obtained even when the temperature is partially below the $Ar_3$ transformation point if the steel composition being treated is within the range defined in the present invention and the rolling is done as defined. Therefore, some dual phase ($\gamma-\alpha$) rolling is within the scope of the present invention. However, it is desirable that the temperature is not lower than 650° C. from the aspect of toughness.

In case where a continuous casting slab is used, the slab is introduced directly to the hot rolling step, for example into a heating furnace for a thick plate mill, and rolled under the condition that the total reduction amount in the temperature range not higher than 930° C. is not less than 50% and the finishing rolling temperature is not higher than 830° C.

Meanwhile, in cases where steel ingots made by the ingot-making process are used, the steel ingot is charged in a heating furnace in the break-down rolling step where it is heated to a temperature ranging from 1250° to 1400° C. to obtain not less than 0.004% TiN in solid solution, and broken down, then subjected to the re-precipitation heating not higher than 1150° C. in a heating furnace of the subsequent hot rolling step, and rolled under the condition that the total reduction amount at 930° C. or lower is not less than 50% and the finishing rolling temperature is not higher than 830° C.

Regarding the cooling rate after the break-down rolling, a higher rate is better, and the effect of the cooling is more remarkable with a lower titanium content. For the subsequent hot rolling step, a plate rolling mill is desirable, but the present invention is not limited thereto and applicable to production of a hot steel strip and steel wire.

The basic rolling condition in the present invention has been described above, but this basic rolling condition should be further limited as below when the reheating is added according to the modification of the present invention. First, the total reduction amount should be limited as below. Thus, the total reduction amount at 900° C. or lower should be 60% or more. If this amount is than 60%, the amount of the fine precipitates of Nb, V or Mo which are required for remarkably increasing the strength and the toughness after the reheating is too low. Thus, the resultant strength and toughness are not satisfactory. On the other hand, if the total reduction amount at 900° C. or lower is more than 95%, Nb, V or Mo precipitates are coarse so that it is difficult to obtain the desired fine carbides. Thus, it is difficult to maintain the desired strength, particularly the desired strength after the reheating.

Regarding the finishing rolling temperature, it should be further limited to 800° C. or lower. Otherwise the amount of the fine precipitates is not enough and the resultant strength and toughness are not satisfactory. On the other hand, when the finishing temperature is below 500° C., it causes deterioration of toughness due to intermittent workings and excessive precipitation of the fine carbides of Nb, V or Mo which coagulate into coarse form during the reheating step so that satisfactory strength cannot be maintained.

When the finishing temperature is low, the rolling is done in a ferrite-predominant zone so that the precipitates of fine carbides of Nb, V or Mo are excessively formed in the worked ferrite matrix. This is rather unfavourable for the strength-toughness balance. Therefore the finishing rolling temperature should be preferably not lower than 700° C. On the other hand, when particularly excellent toughness is to be obtained, coarse precipitates of carbides of Nb, V or Mo are promoted by excessive working in the austenite zone of higher temperatures, and the coarse precipitates coagulate excessively in the reheating step and produce adverse effects on the toughness. Thus, in this case, it is preferable to maintain the finishing temperature not higher than 780° C. Therefore, in respect of both the strength and the toughness, the most preferable finishing temperature range is from 700° to 780° C.

Regarding the heating step after the hot rolling step, this step is required for uniformly and appropriately coarsening the fine carbides of Nb, V and Mo, thus relieving the stress of the matrix due to the precipitation hardening and improving the toughness. For this purpose, a minimum temperature of 300° C. is enough. On the other hand, when the reheating temperature is higher than 750° C., the above fine carbides become coarse excessively, thus lowering the strength considerably. The most preferable reheating temperature range for both the strength and the toughness if from 500° to 700° C. Meanwhile, regarding the holding time in the reheating step, it should be at least one minute for uniformly and appropriately coarsening the fine carbides, thus relieving the stress of the matrix due to the precipitation hardening and improving the toughness.

On the other hand, if the holding time is longer than 10 hours, the fine carbides become excessively coarse, thus lowering the strength considerably. The most preferable holding time range is from 10 minutes to 2 hours for both the strength and the toughness.

The reheating step as defined above may be done before the hot rolled steel sheet cools down near the ordinary temperature. In this case, the reheating also has the effect of hydrogen removal.

The limitations of the production conditions in case where the reheating step is added have been explained before. The steel products obtained by this modification have been found to have also an excellent resistance against the hydrogen-induced cracking.

Although it has not been fully clarified, the hydrogen-induced cracking resistance may be attributed to the fact that the carbon content is low with less segregation, that formation of coarse carbides is prevented by the formation of fine carbides of Nb, V or Mo, and that the stress of the matrix is relieved by the uniform coarsening of the fine carbides during the reheating step.

The present invention will be more clearly understood from the examples shown in the tables.

Tables 1 to 3 show examples according to the basic process of the present invention.

Table 4 shows examples according to the modification of the present invention. In these examples, various steel compositions as shown (G: electric furnace steel; C1, C2, C3: refined in converter and with special phosphorus treatment) were made into slabs (L, M: continuous casting) and hot rolled. The conditions of slab making and hot rolling are shown in Table 4.

Thickness of the products and tensile strength (API test piece) in the direction at right angle to the rolling, 2 mmV Charpy impact property, B. DWTT 85% SATT property, and 2 mmV Charpy impact values of 50% bond portion of sub-merged arc welding joints welded with 30 KJ/cm input are shown in Table 4.

Table 4 further shows the number of cross sectional crackings (per 5 mm thickness) of the test pieces (ground 1 mm on both sides) after immersion in 100% $H_2S$ saturated aqueous solution (25° C.) for 96 hours.

As clearly shown in Table 4 the steels A1, B1, C1, M and N according to the present invention show excellent tensile strength property and toughness, particularly B.DWTT property, as well as excellent weld toughness and hydrogen-induced cracking resistance.

The steels, A2, A3, B2, B3, C2 and C3 having the steel composition within the range defined in the present invention but outside the scope of the present invention in respect to rolling and the reheating conditions show inferior properties.

As clearly understood from the examples, the steel product according to the present invention has excellent strength and toughness and additionally excellent weldability and hydrogen-induced cracking resistance.

The steel product according to the present invention is most suitable for production of steel pipes and also is useful for fittings, tank structural components, shipbuilding materials, frame members of various machine and apparatus for cold regions, etc. where the arrest property is required.

TABLE 1

| Steel No. | | Chemical Composition C | Si | Mn | Nb | V | Mo | Al | Ti | N |
|---|---|---|---|---|---|---|---|---|---|---|
| Present Invention | 1 | 0.03 | 0.28 | 1.46 | 0.05 | 0.07 | — | 0.029 | 0.021 | 0.0068 |
| | 2 | 0.05 | 0.32 | 1.54 | 0.04 | 0.05 | 0.20 | 0.019 | 0.014 | 0.0047 |
| | 3 | " | " | " | " | " | " | " | " | " |
| | 4 | " | " | " | " | " | " | " | " | " |
| | 5 | 0.05 | 0.22 | 1.82 | 0.06 | — | 0.26 | 0.031 | 0.011 | 0.0052 |
| | 6 | " | " | " | " | — | " | " | " | " |
| Comparison | 7 | 0.05 | 0.32 | 1.54 | 0.04 | 0.05 | 0.20 | 0.019 | 0.014 | 0.0047 |
| | 8 | " | " | " | " | " | " | " | " | " |
| | 9 | " | " | " | " | " | " | " | " | " |
| | 10 | 0.12 | 0.21 | 1.46 | 0.05 | 0.06 | — | 0.023 | — | 0.0081 |
| | 11 | 0.03 | 0.24 | 1.51 | 0.04 | 0.05 | 0.10 | 0.029 | — | 0.0061 |
| | 12 | 0.08 | 0.29 | 1.39 | 0.06 | — | 0.18 | 0.021 | 0.042 | 0.0088 |

| | Productions Conditions | | | | | | | | |
|---|---|---|---|---|---|---|---|---|---|
| | Ingot or Slab production Step | | | | Thick plate Production Step | | | | |
| | Continuous Casting | Ingot-Making Method | | TiN | Heating | Heated γ grain | Reduction at | Finishing | Final Thickness |
| No. | Average Cooling Rate (°C./min.)*1 | Soaking Temp.(°C.) | Cooling Rate (°C./min.) | ≦0.02μ (%)*2 | Temp. (°C.) | Size (ASTM No.) | 930° C. or below | Temp. (°C.) | (mm) |
| 1 | 20.0 | — | — | 0.0093 | 1050 | 7.0 | 80 | 760 | 20 |
| 2 | — | 1350 | 1.0 | 0.0062 | 1150 | 4.5 | 75 | 730 | 20 |
| 3 | — | " | " | " | " | " | 75 | 800 | 20 |
| 4 | — | " | " | " | " | " | 55 | 740 | 20 |
| 5 | — | 1320 | 60 | 0.0052 | 1150 | 5.0 | 65 | 740 | 25 |
| 6 | — | " | " | " | " | " | 80 | 690 | 25 |
| 7 | — | 1350 | 1.0 | 0.0062 | 1150 | 5.0 | 35 | 730 | 20 |
| 8 | — | " | " | " | " | " | 55 | 850 | 20 |
| 9 | — | " | " | " | 1150 | 0.5 | 75 | 740 | 20 |
| 10 | — | 1350 | 1.0 | — | 1150 | 1.0 | 75 | 720 | 16 |
| 11 | — | 1350 | 1.0 | — | 1150 | 0.5 | 80 | 760 | 20 |
| 12 | 20.0 | — | — | 0.0026 | 1150 | 1.0 | 75 | 720 | 20 |

| | Properties*3 | | | | | |
|---|---|---|---|---|---|---|
| No. | Yield Point (kg/mm²) | Tensile Strength (kg/mm²) | Elongation (%) | vE-60° C.*4 (kg-m) | vTrs (°C.) | $pT_{100}$*5 (°C.) |
| 1 | 53.0 | 59.8 | 44 | 24.1 | −138 | −80 |
| 2 | 55.6 | 65.7 | 41 | 22.8 | −132 | −74 |
| 3 | 49.1 | 63.6 | 42 | 24.2 | −123 | −66 |
| 4 | 53.2 | 63.1 | 41 | 25.3 | −114 | −58 |
| 5 | 47.8 | 65.9 | 48 | 25.9 | −142 | −78 |
| 6 | 53.9 | 70.3 | 44 | 21.2 | −128 | −69 |
| 7 | 50.3 | 60.9 | 43 | 21.9 | −76 | −34 |
| 8 | 38.8 | 55.3 | 44 | 23.2 | −82 | −32 |
| 9 | 56.2 | 65.8 | 41 | 20.1 | −92 | −46 |
| 10 | 53.2 | 59.9 | 41 | 16.8 | −91 | −26 |
| 11 | 53.8 | 63.3 | 43 | 20.2 | −98 | −48 |
| 12 | 52.8 | 61.9 | 42 | 17.2 | −82 | −32 |

*1Average cooling rate at the center portion of the slab between the molten steel temperature and 1100° C.
*2Contents in the steel before the heating for the final rolling
*3All properties are values at right angle to the final rolling direction.
*4Charpy test pieces were taken from the center of the plate thickness.
*5100% ductility transition temperature by 2mmV press notch Charpy test.

TABLE 2

| Steel No. | | Chemical Composition C | Si | Mn | Nb | V | Mo | Al | Ti | N | S | REM | Ca | REM/S |
|---|---|---|---|---|---|---|---|---|---|---|---|---|---|---|
| Present Invention | 1 | 0.05 | 0.32 | 1.54 | 0.04 | 0.05 | 0.20 | 0.019 | 0.014 | 0.0047 | 0.004 | 0.009 | — | 2.3 |
| | 2 | 0.03 | 0.28 | 1.47 | 0.06 | — | 0.23 | 0.032 | 0.016 | 0.0059 | 0.003 | 0.012 | 0.0008 | 4.0 |
| | 3 | " | " | " | " | — | " | " | " | " | " | " | " | " |
| Comparison | 4 | 0.09 | 0.31 | 1.48 | 0.04 | 0.05 | 0.12 | 0.023 | — | 0.0032 | 0.003 | 0.0011 | 3.0 | |

Production Conditions

| No. | Ingot or Slab Production Step: Continuous Casting: Average Cooling Rate (°C.min) | Ingot-Making*1: Soaking Temp.(°C.) | Ingot-Making*1: Cooling Rate (°C./min.) | TiN ≦0.02μ (%)*1 | Thick Plate Production Step: Heating Temp. (°C.) | Heated γ grain Size (ASTM No.) | Reduction at 930° C. or below | Finishing Temp. (°C.) | Final Thickness (mm) |
|---|---|---|---|---|---|---|---|---|---|
| 1 | — | 1350 | 1.0 | 0.0062 | 1150 | 4.5 | 75 | 740 | 25 |
| 2 | — | 1350 | 60 | 0.0058 | 1150 | 5.0 | 75 | 770 | 20 |
| 3 | — | " | " | " | 1050 | 6.5 | 70 | 760 | 20 |
| 4 | — | 1320 | 1.0 | — | 1150 | 0.5 | 75 | 720 | 20 |

Properties

| No. | Yield Point (kg/mm²) | Tensile Strength (kg/mm²) | Elongation (%) | vE-60° C. (kg-m) | vTrs (°C.) | $pT_{100}$ (°C.) |
|---|---|---|---|---|---|---|
| 1 | 53.6 | 63.7 | 45 | 26.3 | −140 | −87 |
| 2 | 52.5 | 62.6 | 42 | 28.9 | −148 | −81 |
| 3 | 50.3 | 60.9 | 43 | 29.2 | −152 | −103 |
| 4 | 52.1 | 60.6 | 42 | 20.6 | −103 | −59 |

*1Contents in the steel before the heating for the final rolling

TABLE 3

| Steel No. | | Chemical Composition C | Si | Mn | Nb | V | Mo | Cr | Ni | Cu | Al | Ti | N |
|---|---|---|---|---|---|---|---|---|---|---|---|---|---|
| Present Invention | 1 | 0.06 | 0.22 | 0.82 | 0.03 | — | 0.21 | — | 2.30 | — | 0.024 | 0.016 | 0.0073 |
| | 2 | " | " | " | " | — | " | — | " | — | " | " | " |
| | 3 | 0.04 | 0.32 | 1.46 | 0.05 | 0.04 | 0.18 | — | 1.30 | 0.32 | 0.021 0.012 | 0.0053 | |
| | 4 | 0.06 | 0.38 | 1.28 | 0.03 | 0.03 | 0.10 | 0.52 | 0.93 | — | 0.028 | 0.014 | 0.0048 |
| | 5 | 0.05 | 0.29 | 0.91 | 0.06 | — | 0.20 | — | 3.02 | — | 0.033 | 0.021 | 0.0078 |
| | 6 | " | " | " | " | — | " | — | " | — | " | " | " |
| Comparison | 7 | 0.06 | 0.22 | 0.82 | 0.03 | — | 0.21 | — | 2.30 | — | 0.024 | 0.016 0.0073 | |
| | 8 | " | " | " | " | — | " | — | " | — | " | " | " |
| | 9 | 0.03 | 0.31 | 1.39 | 0.06 | 0.05 | 0.15 | — | 1.38 | 0.39 | 0.028 | — | 0.0081 |
| | 10 | " | " | " | " | " | " | — | " | " | " | — | " |

Production Conditions

| No. | Ingot or Slab Production Step: Continuous Casting: Average Cooling Rate (°C./min.)*1 | Ingot-Making Method: Soaking Temp. (°C.) | Ingot-Making Method: Cooling Rate (°C./min.) | TiN ≦0.2μ (%)*2 | Thick Plate Production Step: Heating Temp. (°C.) | Heated γ grain Size (ASTM No.) | Reduction at 930° C. or below | Finishing Temp. (°C.) | Final Thickness (mm) |
|---|---|---|---|---|---|---|---|---|---|
| 1 | — | 1350 | 60 | 0.0069 | 1150 | 5.0 | 80 | 720 | 35 |
| 2 | — | " | " | " | 1050 | 7.0 | 55 | 720 | 35 |
| 3 | — | 1350 | 1.0 | 0.0054 | 1050 | 6.5 | 75 | 740 | 35 |
| 4 | — | 1350 | 1.0 | 0.0058 | 1150 | 4.5 | 65 | 720 | 25 |
| 5 | 20.0 | — | — | 0.0082 | 1150 | 5.0 | 75 | 740 | 35 |
| 6 | " | — | — | " | " | " | 65 | 810 | 35 |
| 7 | — | 1350 | 60 | 0.0069 | 1150 | 5.0 | 40 | 720 | 35 |
| 8 | — | " | " | " | 1050 | 7.0 | 55 | 830 | 35 |
| 9 | 20.0 | — | — | — | 1150 | 1.5 | 75 | 760 | 35 |
| 10 | " | — | — | — | 1050 | 2.5 | 75 | 760 | 35 |

Properties

| No. | Yield Point (kg/mm²) | Tensile Strength (kg/mm²) | Elongation (%) | vE-60° C. (kg-m) | vTrs (°C.) | $pT_{100}$ (°C.) |
|---|---|---|---|---|---|---|
| 1 | 52.3 | 67.3 | 49 | 23.2 | −128 | −71 |
| 2 | 53.6 | 68.2 | 50 | 25.8 | −134 | −79 |
| 3 | 46.8 | 62.4 | 49 | 24.3 | −133 | −80 |
| 4 | 50.4 | 65.0 | 46 | 22.5 | −126 | −72 |
| 5 | 53.8 | 68.7 | 50 | 23.8 | −135 | −79 |
| 6 | 49.2 | 62.9 | 51 | 26.2 | −121 | −70 |
| 7 | 51.9 | 68.8 | 50 | 17.4 | −96 | −48 |
| 8 | 39.5 | 54.6 | 51 | 20.1 | −89 | −39 |
| 9 | 47.4 | 63.5 | 47 | 15.2 | −97 | −38 |
| 10 | 48.6 | 64.2 | 48 | 19.2 | −102 | −43 |

*1Average cooling rate at the center portion of the slab between the molten steel temperature and 1100° C.
*2Contents in the steel before the heating for the final rolling

TABLE 4

| Steel* No. | | Chemical Composition (wt. %) C | Si | Mn | P | S | Al | O | N | Ti | Nb | V | Mo | Others |
|---|---|---|---|---|---|---|---|---|---|---|---|---|---|---|
| O | A1 | 0.04 | 0.26 | 1.52 | 0.016 | 0.004 | 0.036 | 0.006 | 0.0050 | 0.014 | 0.037 | 0.061 | 0.24 | — |
| | A2 | " | " | " | " | " | " | " | " | " | " | " | " | — |
| | A3 | " | " | " | " | " | " | " | " | " | " | " | " | — |
| O | B1 | 0.08 | 0.20 | 1.38 | 0.012 | 0.003 | 0.028 | 0.005 | 0.0049 | 0.012 | 0.030 | — | 0.28 | Ni 1.60 |
| | B2 | " | " | " | " | " | " | " | " | " | " | — | " | " |
| | B3 | " | " | " | " | " | " | " | " | " | " | — | " | " |
| 0 | C1 | 0.03 | 0.25 | 1.90 | 0.008 | 0.004 | 0.035 | 0.004 | 0.0051 | 0.007 | 0.041 | — | 0.31 | Rare earth element 0.02 |
| | C2 | " | " | " | " | " | " | " | " | " | " | — | " | Rare earth element 0.02 |
| | C3 | " | " | " | " | " | " | " | " | " | " | — | " | Rare earth element 0.02 |
| | I | 0.13 | 0.18 | 1.26 | 0.020 | 0.003 | 0.050 | 0.006 | 0.0051 | 0.015 | 0.036 | 0.071 | 0.30 | Ni 0.60 |
| | J | 0.08 | 0.19 | 1.52 | 0.013 | 0.006 | 0.041 | 0.006 | 0.0075 | — | 0.051 | 0.060 | — | Rare earth element 0.02 |
| | K | 0.06 | 0.26 | 1.45 | 0.019 | 0.005 | 0.036 | 0.005 | 0.0061 | 0.046 | — | — | — | — |
| | L | 0.08 | 0.25 | 1.36 | 0.025 | 0.014 | 0.030 | 0.006 | 0.0050 | 0.010 | 0.041 | — | 0.30 | — |
| O | M | 0.02 | 0.11 | 1.65 | 0.020 | 0.003 | 0.026 | 0.005 | 0.0055 | 0.013 | 0.011 | 0.056 | 0.27 | Ni 0.20; Cu 0.26; Rare earth element 0.009 |
| O | N | 0.08 | 0.15 | 1.38 | 0.018 | 0.003 | 0.030 | 0.006 | 0.0070 | 0.012 | 0.060 | 0.080 | — | Ni 0.76; Ca 0.008 |

| Ingot or Slab Production Step: Continuous Casting Average Cooling Rate (°C./min.)*1 | Ingot-Making Method Soaking Temp. (°C.) | Cooling Rate (°C./min.) | Tin ≦0.02μ (%)*2 |
|---|---|---|---|
| — | 1350 | 1.0 | 0.0068 |
| — | " | " | 0.0060 |
| — | " | " | 0.0062 |
| — | 1320 | 1.0 | 0.0059 |
| — | " | " | 0.0057 |
| — | " | " | 0.0056 |
| — | 1350 | 60 | 0.0060 |
| — | " | " | 0.0059 |
| — | " | " | 0.0061 |
| — | 1320 | 1.0 | 0.0048 |
| — | 1350 | 60 | — |
| — | 1350 | 1.0 | 0.0030 |
| 19.0 | — | — | 0.0076 |
| 18.5 | — | — | 0.0088 |
| — | 1350 | 60 | 0.0069 |

| Hot Rolling Conditions: Slab Heating Temperature (°C.) | Heated γ Grain Size (ASTM No.) | Total Reduction at 900° C. or below (%) | Finishing Rolling Temperature (°C.) | Reheating Step: Holding Temperature (°C.) | Holding Time (min.) |
|---|---|---|---|---|---|
| 1150 | 6.5 | 70 | 720 | 630 | 30 |
| " | 6.0 | " | " | — | — |
| " | 6.5 | 45 | 800 | 630 | 30 |
| 1150 | 6.0 | 70 | 720 | 600 | 20 |
| " | 5.5 | " | " | — | — |
| " | 5.5 | 55 | 770 | 600 | 20 |
| 1150 | 6.5 | 70 | 700 | 660 | 40 |
| 1250 | 6.5 | 55 | 750 | " | " |
| " | 6.5 | 60 | 820 | " | " |
| 1150 | 4.0 | 70 | 720 | 630 | 30 |
| 1150 | 0.5 | 70 | 730 | 640 | 30 |
| 1250 | 1.5 | 70 | 700 | 650 | 20 |
| 1150 | 6.5 | 65 | 690 | 630 | 30 |
| 1050 | 7.0 | 70 | 720 | 530 | 5 |
| 1150 | 6.5 | 65 | 700 | 590 | 20 |

| Product Thickness (mm) | Tensile Properties: Yield Point (kg/mm²) | Tensile Strength (Kg/mm²) | Toughness Properties: 2mmV Charpy Impact Test: Absorbed Impact Energy at VE −40° C. (kg-m) | Transition Temperature vTrs (°C.) | B. DWTT 85% SATT (°C.) | Charpy Impact Absorbed Energy at Welded Portion −40° C. 2mmV (Kg-m) | Hydrogen Induced Cracking Resistance Number of Cross Sectional Crackings (mm) |
|---|---|---|---|---|---|---|---|
| 32 | 54 | 64 | 27 | −120 | −55 | 18 | 0 |
| " | 50 | 62 | 16 | −80 | −35 | 16 | 4 |
| " | 48 | 61 | 14 | −85 | −30 | 17 | 1 |

TABLE 4-continued

| | | | | | | | |
|---|---|---|---|---|---|---|---|
| 26 | 57 | 68 | 30 | −140 | −80 | 16 | 1 |
| " | 54 | 63 | 17 | −90 | −50 | 15 | 8 |
| " | 55 | 66 | 19 | −100 | −40 | 16 | 5 |
| 41 | 65 | 75 | 13 | −110 | −45 | 8 | 1 |
| " | 59 | 72 | 7 | −95 | −20 | 5 | 7 |
| " | 58 | 71 | 4 | −90 | −15 | 7 | 6 |
| 26 | 50 | 63 | 8 | −45 | −25 | 12 | 7 |
| 26 | 52 | 64 | 4 | −40 | −15 | 6 | 3 |
| 32 | 51 | 63 | 7 | −60 | −30 | 7 | 5 |
| 26 | 50 | 62 | 6 | −40 | −15 | 2 | 9 |
| 32 | 53 | 64 | 25 | −120 | −55 | 24 | 0 |
| 26 | 56 | 66 | 18 | −105 | −50 | 12 | 1 |

*Steels manufactured by the present invention are marked with a circle (O).
*[1]Average cooling rate at the center portion of the slab between the molten steel temperature and 1100° C.
*[2]Contents in the steel before the heating for the final rolling

What is claimed is:

[1. A process for producing a high tension steel sheet having excellent low-temperature toughness with a yield point not lower than 40 kg/mm$^2$ which comprises heating a steel ingot or slab to a temperature not higher than 1150° C., and rolling the steel ingot or slab thus heated with a total reduction amount not less than 50% in a temperature range not higher than 930° C. and a finishing temperature not higher than 830° C., said steel ingot or slab containing 0.01 to 0.13% C, 0.1 to 1.0% Si, 0.7 to 2.0% Mn, not more than 0.1% total Al, 0.004 to 0.03% Ti, 0.001 to 0.009% total N, 0.01 to 0.10% Nb, 0.01 to 0.15% V, 0.05 to 0.40% Mo, with the balance being unavoidable impurities and Fe, in which $(Nb\%)\times(C\%)\leqq 5\times 10^{-3}$ and TiN not larger than 0.02μ is not less than 0.004%.]

[2. A process for producing a high tension steel sheet having excellent low-temperature toughness with a yield point not lower than 40 kg/mm$^2$ which comprises heating a steel ingot or slab to a temperature not higher than 1150° C., and rolling the steel ingot or slab thus heated with a total reduction amount not less than 50% in a temperature range not higher than 930° C. and a finishing temperature not higher than 830° C., said steel ingot or slab containing 0.01 to 0.13% C, 0.1 to 1.0% Si, 0.7 to 2.0% Mn, not more than 0.1% total Al, 0.004 to 0.03% Ti, 0.001 to 0.009% total N, 0.01 to 0.10% Nb, 0.05 to 0.40% Mo, 0.01 to 0.15% V, and one or both of 0.001 to 0.03% REM, 0.0005 to 0.03% Ca, with the balance being unavoidable impurities and Fe in which $(Nb\%)\times(C\%)\leqq 5\times 10^{-3}$, REM/S=1.0 to 6.0 in case of REM addition, and TiN not larger than 0.02μ is not less than 0.004%.]

[3. A process for production a high tension steel sheet having excellent low-temperature toughness with a yield point not lower than 40 kg/mm$^2$ which comprises heating a steel ingot or slab to a temperature not higher than 1150° C. and rolling the steel ingot or slab thus heated with a total reduction amount not less than 50% in a temperature range not higher than 930° C. and a finishing temperature not higher than 830° C., said steel ingot or slab containing 0.01 to 0.13% C, 0.1 to 1.0% Si, 0.7 to 2.0% Mn, not more than 0.1% total Al, 0.004 to 0.03% Ti, 0.001 to 0.009% total N, 0.01 to 0.10% Nb, 0.01 to 0.15% V and 0.05 to 0.40% Mo, one or more of not more than 0.6% Cr, not more than 1.0% Cu, and not more than 4.0% Ni with the balance being unavoidable impurities and Fe in which $$(Nb\%)\times(C\%)\leqq 5\times 10^{-3}$$

$$(Cu+Ni)/5+Cr+Mo\leqq 0.90\%$$

and TiN not larger than 0.02μ is not less than 0.004%.]

[4. A process for producing a high tension steel sheet having excellent low-temperature toughness with a yield point not lower than 40 kg/mm$^2$ which comprises heating a steel ingot or slab to a temperature not higher than 1150° C. and rolling the steel ingot or slab thus heated with a total reduction amount not less than 50% in a temperature range not higher than 930° C. and a finishing temperature not higher than 830° C., said steel ingot or slab containing 0.01 to 0.13% C, 0.1 to 1.0% Si, 0.7 to 2.0% Mn, not more than 0.1% total Al, 0.004 to 0.03% Ti, 0.001 to 0.009% total N, 0.01 to 0.10% Nb, 0.01 to 0.15% V, 0.05 to 0.40% Mo, one or both of 0.001 to 0.03% REM and 0.0005 to 0.03% Ca, and one or more of not more than 0.6% Cr, not more than 1.0% Cu and not more than 4.0% Ni with the balance being unavoidable impurities and Fe, in which $$(Nb\%)\times(C\%)\leqq 5\times 10^{-3}$$

REM/S=1.0 to 6.0 in case of REM addition $$(Cu\times Ni)/5+Cr+Mo\leqq 0.90\%$$

and TiN not larger than 0.02μ is not less than 0.004%.]

*5. A process for producing steel sheet suitable for pipe lines, having excellent low temperature toughness with a yield point of 40 kg/mm$^2$ or higher and a vTrs value of about −110° C. or lower for a 50% reduction of the steel comprising continuously casting a molten steel into the form of a slab, said molten steel containing 0.01 to 0.13% C, 0.1 to 1.0% Si, 0.7 to 2.0% Mn, not more than 0.1% total Al, 0.004 to 0.03% Ti, 0.001 to 0.009% total N, 0.01 to 0.10% Nb, 0.05 to 0.40% Mo, with the balance being Fe and unavoidable impurities and satisfying the condition of $(Nb\%)\times(C\%)\leqq 5\times 10^{-3}$, cooling the slab thus-obtained by continuous casting with an average cooling rate of 8° C./min. or more as measured in the central portion of the slab through the temperature range from the temperature at the time of pouring to 1100° C. to obtain a slab containing 0.004% or more TiN of a grain size not larger than 0.02μ, heating the slab at 1150° C. or lower and rolling the slab with a total reduction not less than 50% at temperatures not higher than 930° C. and with a finishing temperature not higher than 830° C.*

*6. A process according to claim 5 in which the molten steel further contains one or more of a material selected from the group consisting of 0.01 to 0.15% V, up to 0.6% Cr, up to 1.0% Cu and up to 4.0% Ni within a range of $(Cu+Ni)/5+Cr+Mo\leqq 0.90\%$.*

*7. A process according to claim 5 in which the molten steel further contains one or more of a material selected from the group consisting of 0.001 to 0.03% REM, and 0.0005 to 0.03% Ca, and wherein REM/S is from 1.0 to 6.0.*

* * * * *